May 13, 1941.　　　　J. A. BRUSSET　　　　2,241,842
APPARATUS FOR CLASSIFYING AND SEPARATING PARTICLES
OF MATERIALS OF DIFFERENT SPECIFIC GRAVITIES
Filed Aug. 24, 1940　　　5 Sheets-Sheet 1
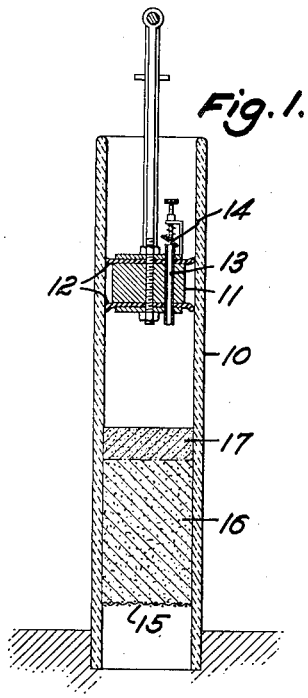
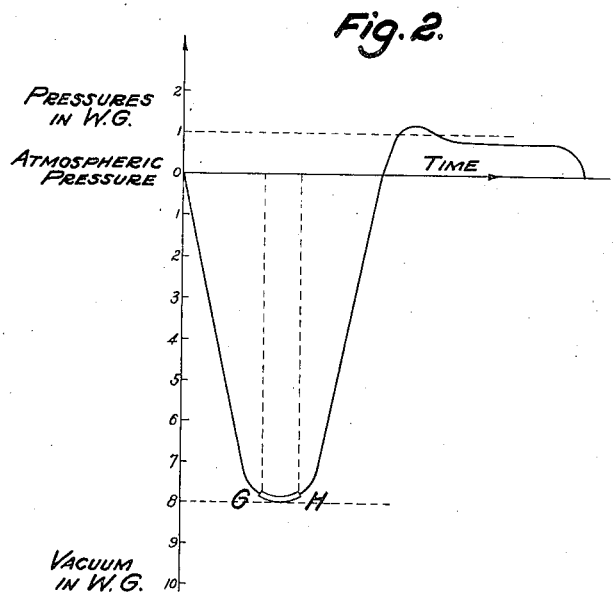
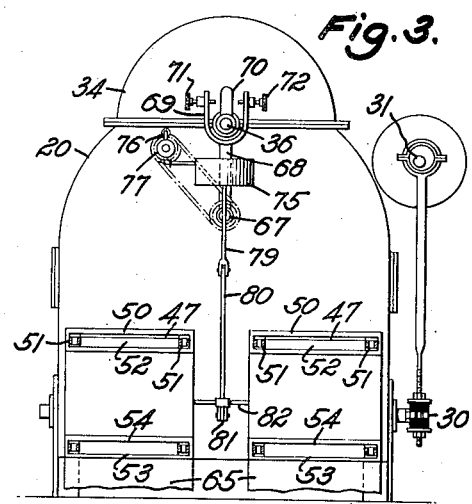
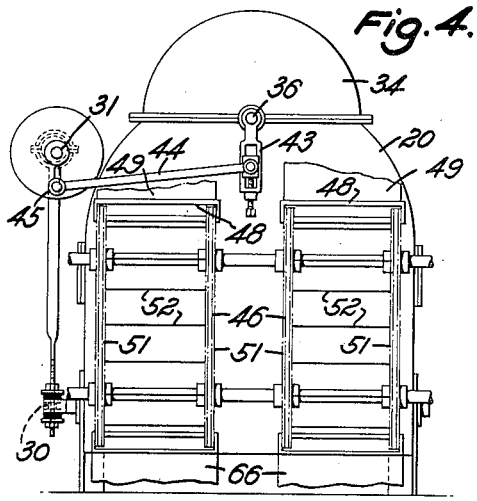
Inventor
Jean Albert Brusset
By Potter, Pierce & Scheffler
Attorneys

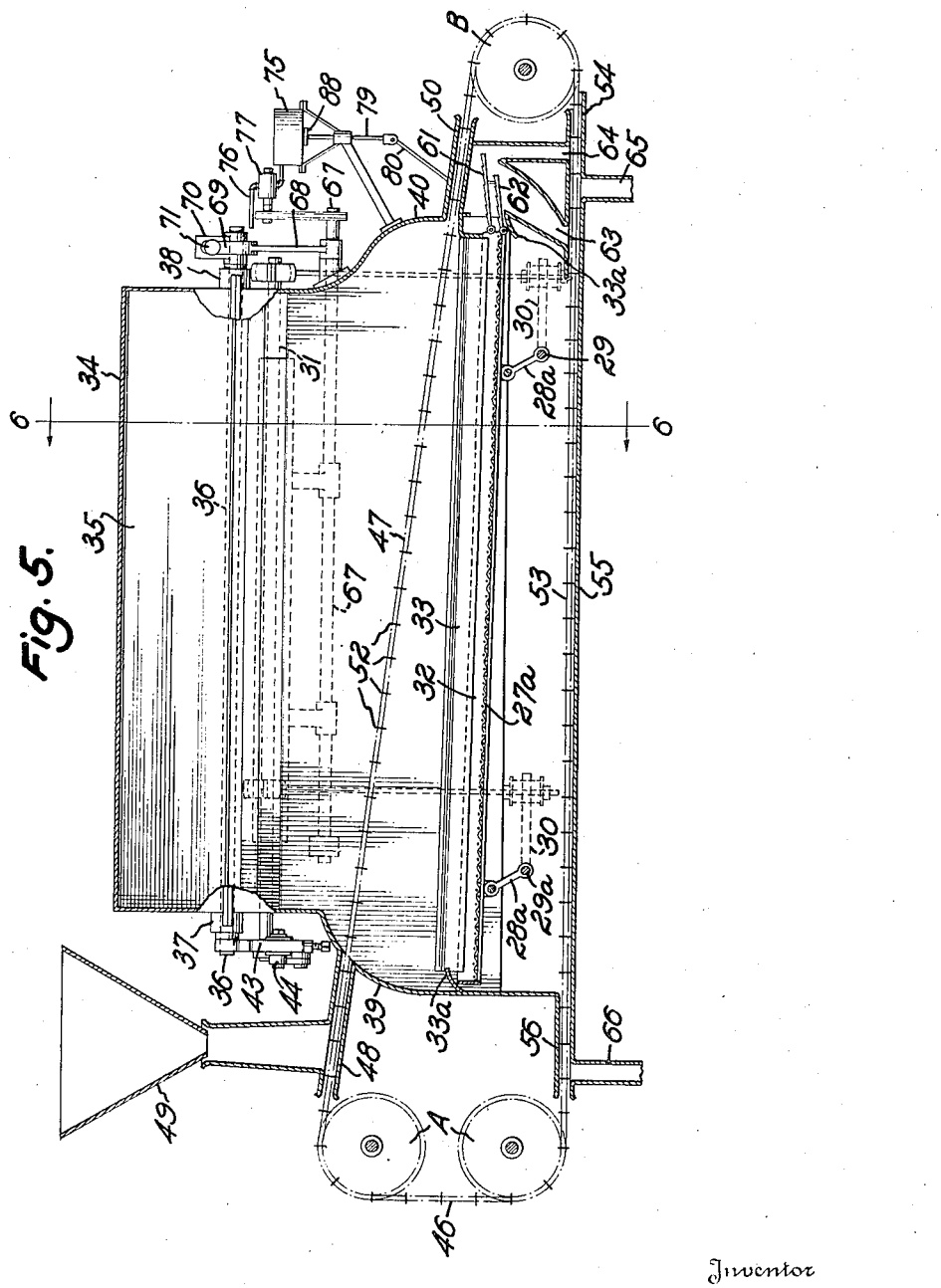

May 13, 1941.                J. A. BRUSSET                2,241,842
        APPARATUS FOR CLASSIFYING AND SEPARATING PARTICLES
              OF MATERIALS OF DIFFERENT SPECIFIC GRAVITIES
                      Filed Aug. 24, 1940        5 Sheets-Sheet 3

Inventor
Jean Albert Brusset
By Potter, Pierce & Scheffler
Attorneys

May 13, 1941.                J. A. BRUSSET                 2,241,842
          APPARATUS FOR CLASSIFYING AND SEPARATING PARTICLES
             OF MATERIALS OF DIFFERENT SPECIFIC GRAVITIES
                        Filed Aug. 24, 1940            5 Sheets-Sheet 4
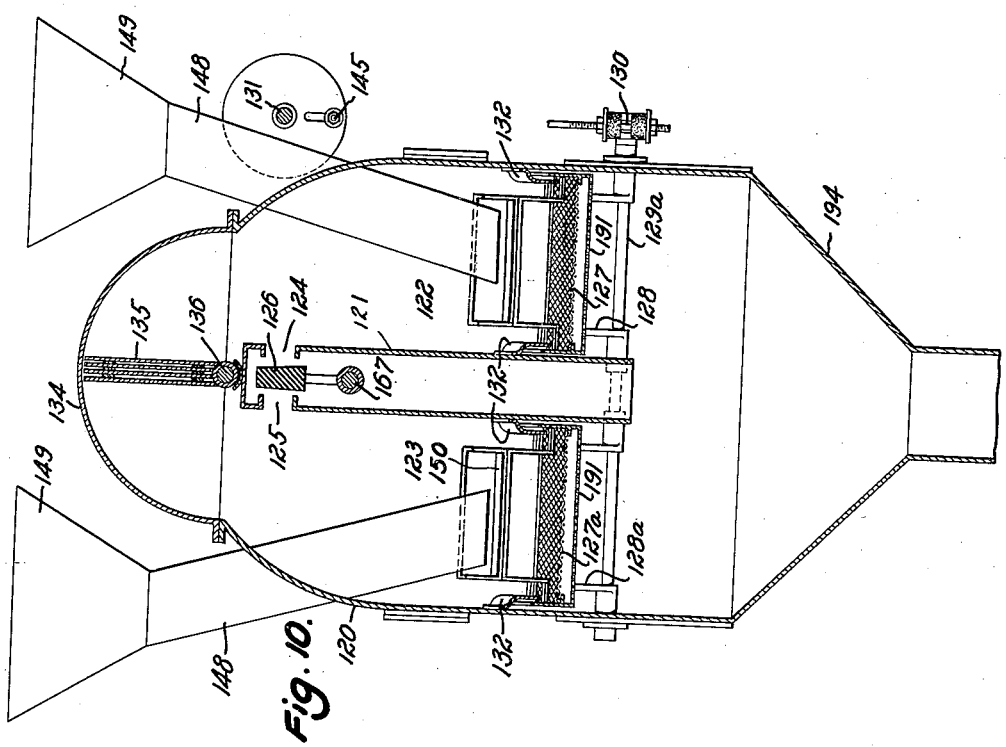
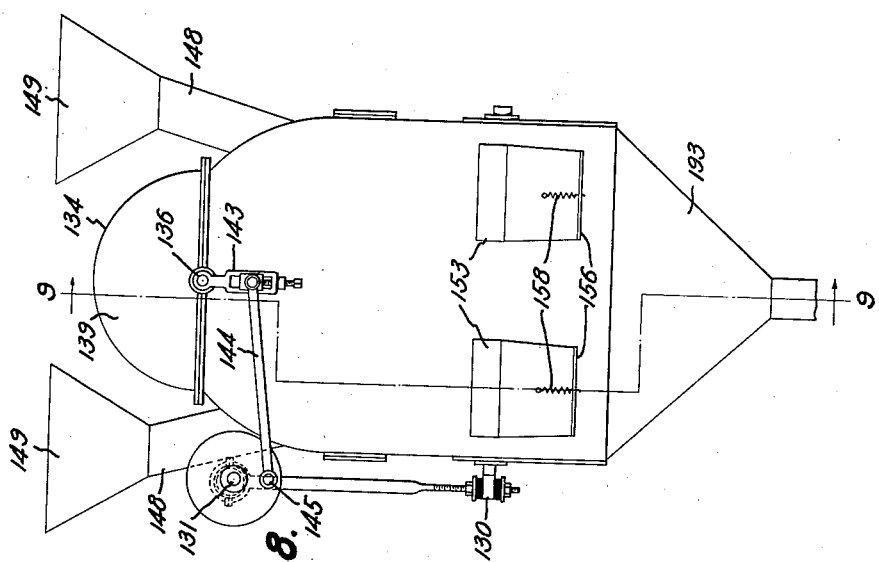
Inventor:
Jean Albert Brusset,
By Potter, Pierce & Scheffler
Attorneys

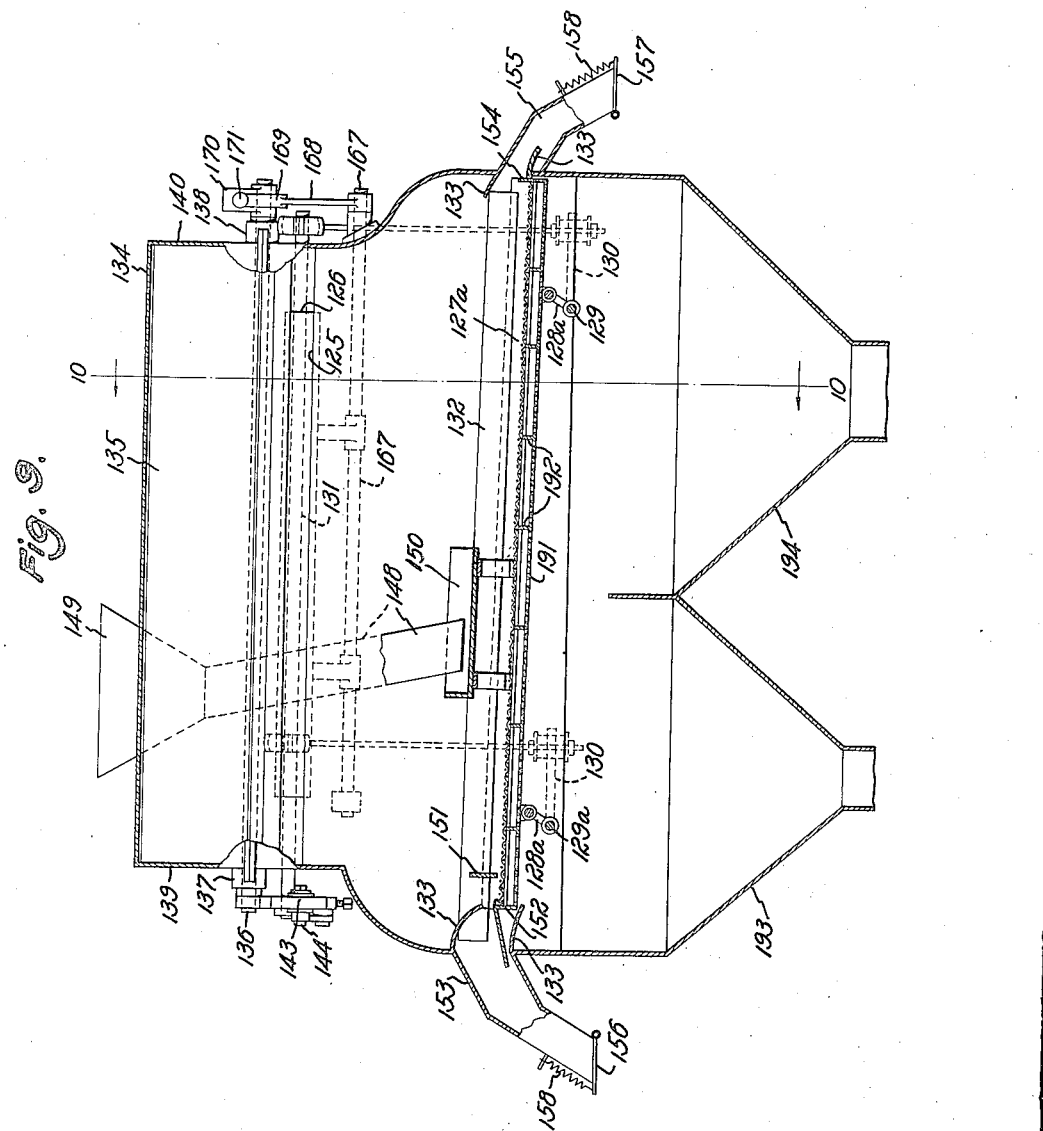

Patented May 13, 1941

2,241,842

UNITED STATES PATENT OFFICE 2,241,842

APPARATUS FOR CLASSIFYING AND SEPARATING PARTICLES OF MATERIALS OF DIFFERENT SPECIFIC GRAVITIES

Jean Albert Brusset, Blairmore, Alberta, Canada

Application August 24, 1940, Serial No. 354,094
In Canada January 21, 1937

19 Claims. (Cl. 209—468)

This invention relates to apparatus for classifying and separating fine particles of materials of different specific gravity according to their specific gravities.

An object of the invention is to provide an apparatus for obtaining a clean-cut separation of particles in a mixture containing materials of different specific gravities without regard to the sizes of the particles.

Another object of the invention is to provide means for separating a mixture of materials of different specific gravities into stratified layers and for separately removing the layers from the apparatus.

A further object is to provide apparatus for separating a mixture of materials of different specific gravities into stratified layers and for discharging the respective layers at opposite ends of the apparatus.

The method comprises establishing a bed of uniform thickness of the mixed material to be classified, in a closed chamber and subjecting the bed alternately to vacuum and pressure from above and also in by-passing air and dust in a closed circuit from the space above to the space beneath the bed.

The invention and the principle of operation thereof will be better understood upon reference to the accompanying drawings which form a part hereof and wherein:

Fig. 1 is a sectional view of an experimental apparatus which illustrates the principle of operation of the invention;

Fig. 2 is a diagram of a typical pressure wave produced in carrying on the process;

Fig. 3 is an end elevation of an apparatus embodying the invention;

Fig. 4 is an end elevation from the opposite end;

Fig. 5 is a vertical longitudinal sectional view on the line 5—5 of Fig. 6;

Fig. 8 is an end elevation of a modified form of the invention;

Fig. 9 is a longitudinal sectional view taken on the line 9—9 of Fig. 8, and

Fig. 10 is a transverse vertical sectional view taken on the line 10—10 of Fig. 9.

Figure 6:
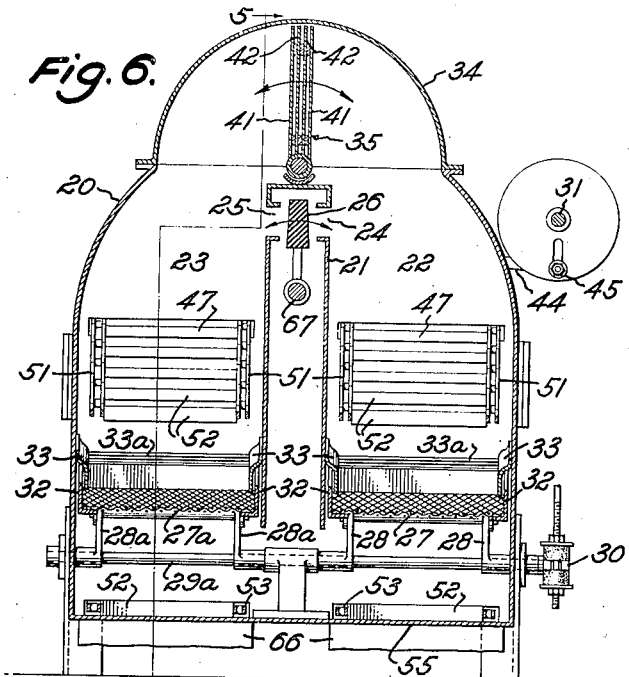
Fig. 6 is a vertical transverse sectional view taken on the line 6—6 of Fig. 5.

The principle of operation of the invention will be understood by reference to the experimental form of apparatus shown in Fig. 1. In this apparatus 10 is a vertically disposed glass tube open at both ends and 11 is a piston adapted to reciprocate in the upper portion of the tube. The piston is provided with suitable packing 12, engaging the side of the tube and with a passage 13 extending vertically therethrough. The passage is controlled at its upper end by a spring closed check valve 14 which relieves the pressure beneath the piston on the down stroke thereof. A perforated screen member 15 is mounted in the tube and forms a support for the material to be acted upon.

In the experiment, a six-inch layer 16 of fine coal comprising all sizes from 0 to ¼" placed on the screen 15 and a one-inch layer 17 of crushed limestone is laid on top of the coal. When the piston is lowered and then quickly raised, the bed of material is raised, following the upward motion of the piston and then drops back onto the screen 15. After a few strokes of the piston the bed will be seen to be stratified into a top layer of clean coal particles of all sizes including fine dust and a bottom layer constituted by a mixture of impure coal and shales, together with the particles of limestone of all sizes which have sunk through the bed of coal.

Since the bed of materials is tightly packed, the reduced pressure created above the bed extends only gradually down through the bed during the suction stroke of the piston, thus creating a pressure gradient through the bed. The buoyant forces arising from this pressure gradient tend to lift the particles of materials in the bed to an extent dependent upon their specific gravities. By suitably adjusting the amount of vacuum created above the bed it is possible to so proportion the buoyant forces arising from the pressure gradient to the specific gravities of the component materials that materials lighter than a selected specific gravity are lifted while materials heavier than the selected specific gravity are not lifted.

By adjusting the speed and stroke of the piston it is possible readily to create a partial vacuum of such a value that the lighter particles of coal within a given range of specific gravity will be raised, while the particles of material of greater specific gravity will not be lifted but will work to the bottom under the action of the successive pulsations.

It is to be noted that due to a very slight infiltration of air through the bed toward the end of the suction stroke the particles are first subjected to a strong lifting action during the accelerating period of the upstroke and their fall is retarded due to a gradual lessening of the lifting effect by the infiltering air toward the end of the suction stroke and before the beginning of the downstroke. Both the lifting and retarding actions aid in the stratification of the particles according to their specific gravities.

Another advantage of the process is that toward the end of the downstroke of the piston, a small positive back pressure is created above the bed which acts to force back into the bed the very fine dust particles which were brought to the surface by the faint air current which leaks through the bed. Thus, the fine dust particles are kept distributed throughout the bed and the density and resistance of the bed is maintained.

The process thus contemplates the use of a pulsation comprising a vacuum, the value of which is advantageously selected at about 1.3 inches of water gauge per inch of bed for the separation of coal, followed by a positive back pressure of approximately $\frac{1}{10}$ of the maximum value of the vacuum. Fig. 2 illustrates a curve of the subatmospheric and superatmospheric pressures actually registered above the bed in treating a 6" bed of coal in accordance with the invention.

Prior processes employing a fluctuating vacuum or a constant partial vacuum above the bed, or a constant or pulsating pressure beneath the bed have not proven satisfactory as they tend to produce blow holes through the bed, which, once established, quickly enlarge and destroy whatever efficiency the apparatus employed may have. Such processes also result in the production of excessive dust which is difficult to handle.

In the present process, on the contrary, the period of positive back pressure following each period of negative pressure evens up the bed, returns dust particles thereto and results in the maintenance of a flat bed of uniform density.

The advantages of the process may be summarized as follows:

The alternate vacuum and positive pressure periods decrease the leakage of air through the bed.

The back pressure period insures that fine dust is kept well distributed through the bed, instead of being drawn to the top of the bed and into an exhaust conduit. This is a very important feature since the process is based on the resistance of the bed and the success of the process depends to a large extent upon the distribution of the fine particles throughout the bed.

The back pressure, properly adjusted, insures good separation and classification of the finest particles, which have not been successfully handled in prior processes.

The process insures a more stable and uniform condition of the bed and variation in the size of the component particles does not interfere with the successful stratification according to specific gravity alone.

Referring first to the embodiment of the invention shown in Figs. 3 to 7, the apparatus comprises an elongated housing 20 divided longitudinally by a hollow partition wall 21 into two identical chambers 22 and 23 arranged side by side. The lower edge of the hollow partition wall terminates above the bottom of the housing 20 and is provided adjacent its upper end with openings 24 and 25 communicating with the chambers 22 and 23, respectively. The openings 24 and 25 are controlled by a double-acting swinging flap valve member 26 mounted within the hollow wall 21.

Each of the chambers 22 and 23 is provided with a pervious means for supporting the bed of material, which means is preferably in the form of a rectangular shaker-screen 27 and 27a, supported for oscillatory movement longitudinally of the chambers on pairs of swinging arms 28 and 28a carried at one end on pairs of rock shafts 29 and 29a journalled in the walls of the housing 20. The screens are inclined toward the discharge end of the apparatus to facilitate the travel of the bed along the screens. One pair of arms 28 is fast on the shaft 29 and one pair of arms 28a is fast on the shaft 29a and each rock shaft carries a crank arm 30 having eccentric drive connections to a rotary power shaft 31 for oscillating the screens in alternation and in timed relation to other parts of the apparatus.

The spaces between the edges of the screens 27 and the adjacent walls of the chambers are sealed against passage of air around the screens by the co-action of upstanding flanges 32 carried at each side of the screens and overlapping depending flange members 33 secured to the inner faces of the walls of the respective chambers 22 and 23. The clearance between the flanges 32 and 33 is equal to or less than the size of the openings in the screens 27. The spaces between the ends of the screen and housing are closed by curved sealing lips 33a positioned coincident with the arcuate path of the ends of the screen. It will be noted that there is free communication between the spaces beneath the screens 27 on both sides of the open bottom of the partition wall 21.

The upper end of the housing 20 is closed by a semi-cylindrical shell or cap 34 which extends longitudinally of the housing and is centered with respect to the partition wall 21 and the classifying chambers 22 and 23. The inner surface of the shell 34 forms a working surface for an oscillating piston in the form of a pivoted wing 35 which is welded along one edge to a rock shaft 36 mounted at the upper end of the partition 21. The rock shaft 36 is journalled at its ends in bearings 37 and 38 carried by the end walls 39 and 40, respectively, of the housing 20 and is provided at one end with a crank arm 43 which is connected through a link 44 and eccentric 45 to the power shaft 31. Suitable means are provided for varying the effective length of the arm 43 and stroke of the eccentric 45 in order to adjust the stroke of the wing piston 35 to suit varying conditions encountered in the operation of the apparatus.

The wing piston is preferably formed of two spaced metal sheets 41 with two or more steel blades 42 secured between the sheets 41 at the outer edges thereof. This construction produces a cascade of four joints between the edge of the piston and the inner wall of the semi-cylindrical cap 34 which forms the walls of the double-acting pump and the seal thus effected permits a clearance of about $\frac{1}{32}$nd of an inch between the piston and wall to avoid wear due to dust particles in the atmosphere within the chamber.

The feed to and discharge of material from the stratifying compartments of the apparatus are effected by means which are identical for each compartment so that a description of one only will be given. This means comprises an endless conveyor 46, the flights of which pass through the apparatus above and below the shaking screen 27a. The conveyor is supported by driving sprockets A, B adjacent each end of the housing and the upper flight 47 enters the classifying chamber above the screen 27a through a combined air seal and feed passage 48 to which the mixed material is supplied from a hopper 49. The upper flight 47 leaves the separating chamber through a clean coal delivery channel 50. The conveyor is comprised of spaced endless side chains 51 and a plurality of upright slats or bars 52 mounted between the chains. The slats or bars 52 have an area approximating the cross-sectional area of the passages 48 and 50 so that the fine material carried into and out of the apparatus between the conveyor slats aids in filling the inlet and outlet channels to provide an efficient air seal.

After leaving the apparatus through the clean coal delivery channel 50, the conveyor passes around the end sprocket B and the bottom or return flight 53 re-enters the lower portion of the housing 20 through an air seal passage 54 and travels along the bottom wall 55 to the forward end where it leaves through an air seal channel 56. After leaving the housing through the channel 56, the conveyor passes upwardly around the sprockets A and re-enters through the channel 48.

The drive to the oscillating screens 27 and 27a is timed with respect to the oscillations of the piston 35, so that on the upstroke of the piston in one compartment the screen in that compartment moves backward and downwardly toward the feed end and moves upwardly and forwardly toward the delivery end upon the completion of the suction stroke.

As the material passes through the compartments, the bed stratifies into several layers of material according to specific gravity, which layers, during the suction stroke of the piston, tend to be separated from each other by an air gap of varying depth. As the lighter upper layers are more easily lifted, the gap above the heaviest or refuse layer is greater, and, as the screen moves backward and downward as these gaps are being created, it will be seen that the refuse layer readily slides forward on the screen toward the delivery end of the machine.

Separate delivery of the stratified materials at the delivery end of the apparatus is provided for. Here again, the delivery means is the same for each chamber and one only will be described. The top layer of clean coal is carried off by the upper flight of the conveyor 46 through the delivery channel 50. A second delivery opening 60 is provided below the channel 50 and a pair of vertically spaced, parallel reciprocating feed racks 61 and 62 operate through this opening. These racks are in the form of imperforate metal sheets formed with a plurality of steps or teeth facing in the direction of discharge. The lower rack 62 for the discharge of refuse is pivoted directly on the end of the reciprocating screen 27a and reciprocates therewith. The outer end is adjustably supported to regulate the pitch of the rack and thus the rate of discharge in a manner to be presently described. The refuse material falls from the free end of the rack 62 into a refuse box 63.

The rack 61 for the discharge of middlings is spaced above the rack 62 and is also mounted on a pivot movable with the screen 27a in unison with the rack 62 and the outer ends of the racks are connected by a pivoted link 62a so that they are maintained parallel and are adjustable as a unit. The rack 61 is longer than the rack 62 so that the middlings fall from the free end thereof into a middlings discharge box 64.

The middlings fall through the box 64 into the conveyor channel 54 and are carried along by the conveyor and deposited in a middlings outlet 65 disposed in the bottom of the channel between the middlings box 64 and the refuse box 63. The refuse box 63 opens at its bottom into the channel 54 and the refuse material is picked up by the return flight of the conveyor and carried back along the bottom 55 of the housing to the forward end of the apparatus and deposited into the refuse outlet 66 which opens from the bottom of the channel 56, together with the dust which sifts through the screens.

During the operation of the apparatus, a small amount of air will be drawn through the beds from the space underneath, which if allowed to accumulate above the beds would soon affect the value of the reduced pressure produced by operation of the piston 35. The air thus drawn through the bed at each stroke of the piston is returned to the common space beneath the screens by means of the relief valve 26 and hollow partition 21. The valve is preferably formed of a thick piece of rubber carried on a rock shaft 67 which is actuated from the piston shaft 36. As seen in Fig. 3, an upstanding arm 68 is mounted on the end of the shaft 67 and is provided at its upper end with a U-shaped yoke 69 which embraces the end of the rock shaft 36. A cam finger 70 is keyed on the end of the rock shaft and the arms of the yoke 69 are provided with adjustable stops 71 and 72 which are engaged by the finger 70 to shift the valve 26 in synchronism with the motion of the shaft 36 so that it is closed during the latter part of the compression stroke and remains closed during the greater part of the suction stroke and is then opened during the latter part of the suction stroke on each side.

In the operation of the process and apparatus as herein described, the quality of the refuse and middlings is determined by the degree of vacuum produced above the bed and this is adjusted to suit conditions by varying the length and speed of the piston stroke. However, due to the varying proportion of dirt in the coal, the thickness of the refuse and middlings strata in the bed will vary and result in an increase or decrease in the degree of vacuum produced by a given stroke of the piston. In order to correct for such conditions means is provided for automatically varying the rate of discharge of middlings and refuse, such means dependent upon variation in the reduced pressure produced above the bed.

The variation in the rate of discharge is effected by adjusting the pitch of the discharge rack members 61 and 62. Raising the free ends of the racks reduces the rate of discharge and lowering them increases the rate of discharge.

Figure 7:
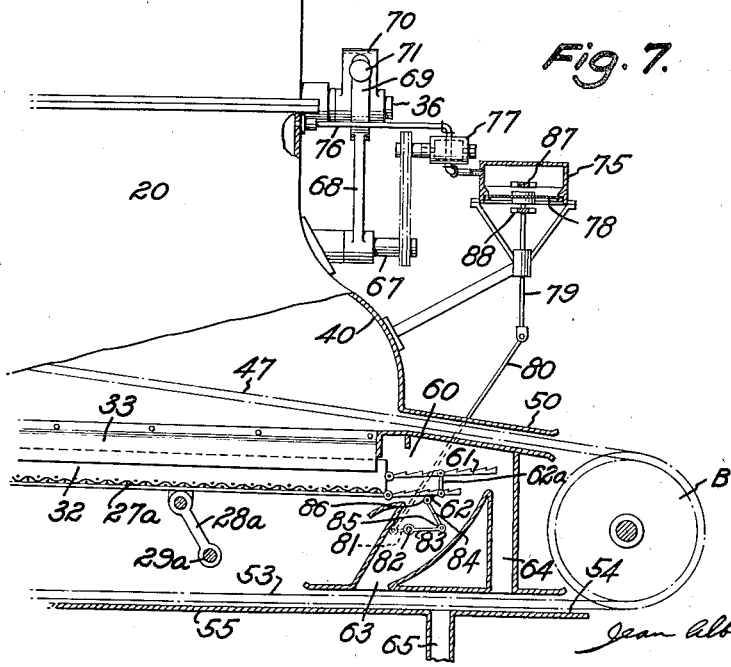
Fig. 7 is a partial longitudinal sectional view on an enlarged scale of the discharge end of the machine, illustrating an automatic discharge control.

The means for effecting automatic adjustment of the middlings and refuse discharge racks is illustrated more particularly in Figs. 3 and 7. A cylindrical diaphragm chamber or housing 75 is mounted at the discharge end of the machine and is connected through a pipe 76 to the upper part of the chamber 22. A rotary valve 77 is mounted in the pipe 76 and is driven in timed relation to the piston 36 so as to be opened to provide communication between the chamber 22 and housing 75 during a selected portion only of the stroke of the piston. For instance, the valve will be open for a time corresponding to the portion G—H of the vacuum period on the curve in Fig. 3. Thus the reduced pressure in the chamber 75 will be maintained relatively constant and will be a measure of the degree of vacuum corresponding to the lowest portion of the curve.

One wall of the chamber 75 is constituted by a flexible diaphragm 78 which reacts in response to fluctuations in pressure in the chamber. The diaphragm 78 is connected by links 79 and 80 to the end of an arm 81 carried by a pivot shaft 82. The shaft 82 forms a support for a parallel linkage mechanism including the rods 83 and 84 and the racks 61 and 62. The rods 83 and 84 are pivotally conected at 85 and the rod 84 is pivotally connected at its upper end to the rack 62 at 86. The other end of the rod 83 is fast on the pivot shaft 82. An increase of the degree of vacuum acting on the diaphragm 78 raises the same and through the lever 81 and parallelogram comprising the rods 83 and 84 results in lowering the discharge ends of the racks 61 and 62. Reversely, a reduction in the degree of vacuum to which the diaphragm is subjected results in raising the discharge ends of the racks to reduce the rate of discharge.

Suitable stops 87 and 88 are provided to limit the movement of the diaphragm.

Since the diaphragm chamber is placed in communication with the stratifying chamber at the same time and only during the same part of each stroke of the piston the only fluctuation of pressure in the diaphragm chamber will be the measure of the change in the maximum degree of vacuum produced in the chamber 22 due to changing conditions in the bed of materials.

It will thus be seen that the invention provides a process which comprises subjecting a bed of mixed materials alternately to vacuum and pressure from above to effect stratification according to specific gravity. More specifically, the process comprises feeding mixture of material to be stratified continuously into a sealed enclosure to provide a bed of substantial and uniform thickness, supporting said bed on an oscillating or shaking screen member, subjecting said bed uniformly over the entire upper area thereof to alternate vacuum and pressure pulsations from above and continuously removing stratified material from the bed. The process also includes the step of regulating the rate of discharge in relation to the density or resistance of the bed.

In the operation of the apparatus of Figs. 3 to 7, the conveyors 46 are continuously driven and carry the mixed material supplied to the hopper 49 through the feed channels 48 and deposit the same onto the oscillating shaker screens in the adjacent stratifying compartments. Due to the shaking action of the screens and the alternate suction and pressure produced by the wing piston in each compartment, the beds of materal quickly reach a uniform thickness over the entire area and as the operation is continued the stratification takes place and the bed, due to the inclination of the screens toward the discharge end, keeps shifting in that direction. It will be noted that the upper flight of the conveyors travels along an inclined path through the compartments and that the discharge channels are lower than the feed channels. This permits the conveyors to drop the material onto the bed at the feed end and to travel out of contact with the bed toward the discharge end where they cut into the upper strata of clean coal in advance of the discharge channels. In this way, the danger of conveying mixed materials straight through the apparatus without stratification is avoided.

Since the discharge racks 61 and 62 are also continuously reciprocated due to their connection with the screens, the discharge of middlings and refuse is also continuous and will vary in rate according to the density or resistance of the bed as measured by the automatic vacuum-controlled regulator.

Referring to the modification of the invention illustrated in Figs. 8 to 10 which is designed particularly for separating a mixture of materials into two components and discharging the same at opposite ends of the same, 120 indicates an elongated housing which is longitudinally divided by a hollow partition wall 121 to provide identical separating chambers 122 and 123 which communicate with the interior of the hollow partition wall through valved openings 124 and 125, respectively. The oppositely disposed openings 124 and 125 are closed or opened by a double-acting swinging flap valve 126 mounted within the hollow wall 121, which latter opens at its lower end into the common space beneath the respective separating compartments.

Mounted in each compartment 122 and 123 is a pervious support for a bed of materials operated upon, the supports being in the form of rectangular shaker screens 127 and 127a, respectively, supported for oscillatory motion longitudinally of the chambers on pairs of swinging arms 128 and 128a, respectively. The arms 128 and 128a are pivotally connected at their upper ends to the frames of the screens and at their lower ends are mounted on horizontal rock shafts 129 and 129a journalled in the side walls of housing 120. The shafts 129 and 129a are mounted at different elevations so that the screens are inclined in the direction on one end of the housing. One pair of arms 128 is fast on the shaft 129 and one pair of arms 128a is fast on the shaft 129a, the other pair in each instance being pivoted on the respective shaft so that the screens work in alternation. Each of the rock shafts 129 and 129a carries a crank arm 130 having eccentric drive connections to a rotary power shaft 131 for oscillating the screens in alternation and in timed relation to other parts of the apparatus.

Sealing flanges 132 for the sides and curved sealing plates 133 for the ends of the screens are provided for preventing passage of air around the latter.

The upper end of the housing 120 is closed by a semi-cylindrical shell 134 centered over the partition wall 121 and a wing piston 135 mounted at one edge on a rock shaft 136 works within said shell. The shaft 136 is journalled at its ends in bearings 137 and 138 carried by the end walls 139 and 140 of the housing 120 and is provided at one end with a crank arm 143 connected by link 144 and eccentric 145 to the power shaft 131.

The mixed material to be classified is fed into each stratifying chamber from hoppers 149 through pipes 148 which deliver the material onto distributing trays 150 mounted on the respective screen frames 127 and 127a in elevated position about one-third of the length of the screens from the upper ends thereof. The trays 150 are open on the side nearest the lower end of the screens and material fed onto the trays is spread onto the bed on the screens as the same falls from the open side of the trays due to the motion of the screen frames.

The double-acting valve 126 is mounted on a rock shaft 167 which is actuated from the piston shaft 136 through the medium of arm 168 and yoke 169 carried thereby which carries adjustable stops 171 and 172 for engagement by cam member 170 on the piston shaft. Adjustment of the stops 171 and 172 determines the relative length of the suction and back-pressure periods produced by the piston above the beds.

The drive to the oscillating screens 127 and 127a is timed with respect to the oscillation of the wing piston 135 and the inclination of the arms 128 and 128a on which the screens are supported is such that on the upstroke of the piston in relation to one compartment, the screen in that compartment moves in a descending path in the direction of the high end of the screen. Upon completion of the suction stroke, the screen moves in an ascending path in the opposite direction. This timing and action of the apparatus causes the heavier material to travel against the force of gravity toward the high end of the screen. The reason for this is that the heavier material stratifies into a lower layer in frictional contact with the screen, but during the suction stroke the screen is kicked away from under the bed as it swings downwardly away from the high end. The bed then falls back in contact with the screen and by frictional contact therewith is kicked toward the high end during the pressure stroke of the piston as the screen swings in the direction of the high end.

As the heavier material travels toward the high end of the screen it passes under a transverse baffle weir 151, which acts as a stop for lighter material in the upper layer, and discharges over the upper edge of weir 152 at the high end of the screen into a delivery chute 153. The lighter material which rises to the top of the bed and is thus not subjected to frictional action of the screen travels toward the low end of the latter and discharges over weir 154 into delivery chute 155. The weirs 151 and 152 are adjustable in height to permit changes in their setting so as to effect best separation under varying conditions and volumes of material.

The outlet ends of the delivery chutes 153 and 155 are closed against ingress of air during the suction stroke of the piston by flap valve plates 156 and 157, respectively, pivoted on the ends thereof and held closed by springs 158. During the pressure stroke of the piston on each side the respective valves are forced open to permit discharge of the material in the delivery chutes.

In order to control suction through the bed on the shaker screens, perforated sectional plates 191 are mounted on the screen frames beneath the screens 127 and 127a in spaced parallel relation thereto. The holes in the plates 191 are larger in area than those in the screens but vary in size in accordance with the character of the bed on the screen directly above each section. The openings in the plates 191 are preferably graduated in size from the high to the lower end of the screen frame, with the largest openings under the high end where the heavier components are removed and the smallest under the low end where the lighter components are removed. Transverse partitions 192 are provided at intervals to seal off the spaces above the differently perforated sections of plates 191 from each other.

In cases where unsized material is fed to the apparatus, the back-pressure produced above the bed forces a part of the finer particles completely through the bed and screens supporting the same. As there is a relation between the composition of material passing through the bed and the part of the bed overlying the section of screen through which it falls, it is desirable to keep separate the material passing through different sections of the bed. For this purpose the lower portion of the housing 120 is formed to provide two or more collecting hoppers 193 and 194 spaced to receive and keep separate fines which pass through and fall from different parts of the bed.

The proportion of fine particles passing through the bed and discharging through the screens can be controlled or substantially completely suppressed by adjustment of the back-pressure produced above the bed. This control of the extraction and classification of fines is an important feature of the invention and is of great value in many cases.

The operation of this form of the invention will be clear from the above description.

While preferred embodiments of the invention and manner of practicing the process have been illustrated and described by way of example, it is to be understood that various other modifications of the apparatus and steps in the process may be resorted to without departing from the spirit of the invention within the scope of the appended claims. It will also be understood that while the apparatus as shown and described is primarily intended for the treatment of coal, the same may be used with or without slight modifications to treat any other mixtures of fine materials of different specific gravities.

This application is a continuation-in-part of my copending application Serial No. 206,474, filed May 6, 1938, which is a continuation-in-part of my application Serial No. 155,622, filed July 26, 1937.

I claim:

1. Apparatus for the stratification of mixtures of materials of different specific gravities, comprising a housing providing a substantially air-tight stratifying compartment, an oscillating pervious member for sustaining a bed of mixed materials in said compartment intermediate the top and bottom thereof, means for establishing alternately sub-atmospheric and super-atmospheric pressures in said compartment above said pervious member and means for establishing communication between the spaces above and beneath said pervious member during a portion of the times when super-atmospheric pressure is established above the same.

2. Apparatus for the stratification of mixtures of materials of different specific gravities comprising a housing providing a substantially air-tight stratifying compartment, an oscillating pervious support disposed in said compartment intermediate the top and bottom thereof for sustaining a bed of material to be treated, a piston chamber communicating with said compartment above said support, a piston operable in said piston chamber, and valve means operable in timed relation to the operation of said piston for alternately establishing vacuum and pressure conditions above said bed.

3. Apparatus for the stratification of mixtures of materials of different specific gravities comprising a housing providing a substantially air-tight rectangular stratifying compartment, a substantially rectangular pervious support for a bed of materials mounted in said housing for oscillatory movement in the direction of its length, an endless conveyor having a flight movable through said compartment above said support for feeding mixed materials onto the same at one end and for removing the top layer of stratified material at the other end thereof, means providing a piston chamber at the top of said compartment, a piston element operable in said chamber for establishing alternately vacuum and pressure conditions above said bed, and means for by-passing a portion of the air from above the bed to beneath the same during at least a portion of the pressure periods.

4. Apparatus for the stratification of mixtures of materials of different specific gravities comprising a housing providing a substantially air-tight rectangular stratifying compartment, a pervious support for a bed of materials mounted in said housing for oscillatory movement in the direction of its length, an endless conveyor having a flight movable through said compartment above said support for feeding mixed materials onto the same at one end and for removing the top layer of stratified material at the other end thereof, means providing a piston chamber at the top of said compartment and a piston element operable in said chamber for establishing alternately vacuum and pressure conditions above said bed and means for operating said piston element and for oscillating said pervious support in timed relation to each other.

5. Apparatus for the stratification of mixtures of materials of different specific gravities comprising a housing providing a substantially air-tight rectangular stratifying compartment, a pervious support for a bed of materials mounted in said housing for oscillatory movement in the direction of its length, an endless conveyor having a flight movable through said compartment above said support for feeding mixed materials onto the same at one end and for removing the top layer of stratified material at the other end thereof, means providing a piston chamber at the top of said compartment and a piston element operable in said chamber for establishing alternately vacuum and pressure conditions above said bed, means for oscillating said pervious support, adjustable separate discharge means for intermediate and lower layers of stratified materials, and means responsive to the degree of vacuum produced above the bed by operation of said piston for controlling the adjustment of said discharge means.

6. An apparatus according to claim 5, in which the means for controlling the rate of discharge of the intermediate and lower layers of stratified material comprises a diaphragm chamber having communication with the upper portion of said compartment, a flexible diaphragm responsive to pressures in said chamber, connections from said diaphragm to said adjustable discharge means, and valved means operating in timed relation to said piston to establish communication between said compartment and diaphragm chamber only during the period of maximum vacuum produced in said compartment at each stroke of the piston.

7. Apparatus for the stratification of a mixture of materials of different specific gravities comprising means providing two adjacent stratifying compartments, a piston chamber connecting the upper ends of said compartments, a double acting piston in said piston chamber for alternately producing a partial vacuum and a back pressure in each compartment, a pervious support for a bed of materials disposed in each compartment intermediate the top and bottom thereof, and means for by-passing a portion of the air from above the bed in one compartment to beneath the bed in the other compartment.

8. Apparatus for the stratification of a mixture of materials of different specific gravities comprising a substantially closed housing, a vertically disposed partition wall dividing said housing into two symmetrical stratifying compartments, a pervious oscillating material support mounted in each compartment intermediate the top and bottom thereof and dividing each compartment into upper and lower chambers, a semi-cylindrical piston chamber connecting the upper chambers of said compartments, a double acting wing piston member operable in said piston chamber for creating in the upper chamber of each compartment alternately a vacuum and a positive back pressure, the lower end of said partition wall terminating above the bottom of said housing to provide free communication between the lower chambers of each compartment, means providing a by-pass connection between the upper chambers of each of said compartments and the lower chambers thereof, valve means for controlling connection between said upper chambers and said by-pass, and means for actuating said valve means and said piston in timed relation to establish communication between the respective upper chambers and the by-pass during a selected portion of the back-stroke of said piston.

9. Apparatus for the stratification of mixtures of materials of different specific gravities comprising means providing two adjacent closed stratifying compartments, a piston chamber connecting the upper ends of said compartments, a double acting piston in said piston chamber for alternately producing a partial vacuum and a back pressure in each compartment, a pervious support for a bed of materials disposed in each compartment above the bottom thereof, and means for by-passing air and dust in a closed circuit alternately from above the bed in one compartment to beneath the bed in the other compartment.

10. Apparatus for the stratification of a mixture of materials of different specific gravities comprising mean sproviding two adjacent stratifying compartments, a pervious support for a bed of materials disposed in each compartment intermediate the top and bottom thereof, means for alternately producing a partial vacuum and a back pressure above the bed in each compartment, and means for by-passing a portion of the air from above the bed in one compartment to beneath the bed in the other compartment.

11. Process for the stratification of a mixture of materials of different specific gravities which comprises establishing a bed of said materials, subjecting said bed alternately to vacuum and pressure conditions from above the same and by-passing a portion of the air and dust from above said bed to beneath the same.

12. Process for the stratification of a mixture of materials of different specific gravities which comprises establishing adjacent beds of said mixture, subjecting said beds alternately to a partial vacuum and a back pressure and by-passing air and dust in a closed circuit alternately from above one of said beds to beneath the other of said beds.

13. In apparatus for the stratification of mixtures of materials of different specific gravities, a housing providing a substantially air-tight stratifying compartment, an inclined oscillating pervious support disposed in said compartment intermediate the top and bottom thereof for sustaining a bed of material to be treated, means for establishing alternately subatmospheric and super-atmospheric pressures in said compartment above said pervious support, means for oscillating said pervious support in timed relation to the operation of said pressure establishing means to advance said support downwardly and in the direction of the lower end thereof coincidentally with the establishment of a sub-atmospheric pressure above the same, means for feeding mixed materials onto said pervious support intermediate the ends thereof, means for removing an upper layer of stratified material from said support at the lower end thereof and means for removing an under layer of stratified material from said support at the upper end thereof.

14. Apparatus for the stratification of mixtures of materials of different specific gravities comprising a housing providing a substantially airtight stratifying compartment, an inclined oscillating pervious support disposed in said compartment intermediate the top and bottom thereof for sustaining a bed of material to be treated, a piston chamber communicating with said compartment above said support, a piston operable in said piston chamber for establishing alternately vacuum and pressure conditions above said bed, means for oscillating said pervious support in timed relation to the operation of said piston to shift said support in a descending path in the direction of the lower end thereof coincidentally with the establishment of a vacuum condition above said support, means for feeding mixed materials onto said support intermediate the ends thereof, and means for removing stratified materials at opposite ends thereof.

15. Apparatus for the stratification of mixtures of materials of different specific gravities comprising a housing providing a substantially airtight rectangular stratifying compartment, an inclined previous support for a bed of materials mounted in said housing for oscillatory movement in the direction of its length, means for feeding mixed materials onto the same intermediate the ends thereof, means for removing an upper layer of stratified material at the lower end thereof, means for removing an under layer of stratified material at the upper end thereof, means providing a piston chamber at the top of said compartment and a piston element operable in said chamber for establishing alternately vacuum and pressure conditions above said bed and means for operating said piston element and for oscillating said pervious support in timed relation to each other to move said support downwardly and toward the lower end thereof during establishment of vacuum conditions above the bed.

16. Apparatus for the stratification of a mixture of materials of different specific gravities comprising means providing two adjacent stratifying compartments, a piston chamber connecting the upper ends of said compartments, a double-acting piston in said piston chamber for alternately producing a partial vacuum and a back pressure in each compartment, an inclined pervious support for a bed of materials disposed in each compartment intermediate the top and bottom thereof, means for oscillating said inclined pervious supports in alternation and in timed relation with the operation of said piston to move said supports downwardly and in the direction of the lower ends thereof coincidentally with the establishment of a partial vacuum in the respective compartments, means for feeding mixed materials onto said supports, means for removing stratified materials from opposite ends of said supports, and means for by-passing a portion of the air from above the bed in one compartment to beneath the bed in the other compartment.

17. Apparatus according to claim 13, in which said pervious support comprises a screen support for the bed of materials, a perforated plate mounted beneath said screen in spaced relation thereto, the perforations in said plate varying in size from one end to the other, and means for dividing the space between said screen support and said plate into a plurality of compartments.

18. Apparatus acording to claim 13, and a plurality of collecting hoppers for receiving and separating fine material passing through the various areas of said pervious support.

19. In apparatus according to claim 13, an overflow weir at each end of said support over which the respective stratified layers are discharged, and a baffle weir spaced from the overflow weir at the higher end of said support.

JEAN ALBERT BRUSSET.